Patented Aug. 13, 1940

2,211,624

UNITED STATES PATENT OFFICE 2,211,624

ORGANIC SUBSTITUTED ACETIC ACID

Donald J. Loder and Edward P. Bartlett, Wilmington, Del., assignors to E. I. du Pont de Nemours & Company, Wilmington, Del., a corporation of Delaware No Drawing. Application April 9, 1938, Serial No. 201,181

17 Claims. (Cl. 260—488)

This invention relates to a process for the preparation of substituted acetic acids and more especially to the preparation of such acids by the interaction of formaldehyde and an organic acid with carbon monoxide.

An object of the present invention is to provide an improved process for the preparation of substituted acetic acids. Another object of the invention is to provide an economical process for the preparation of acyl-oxy-substituted acetic acids having the formula $CH_2(OX)COOH$, in which X is an acyl group. Yet another more specific object of the invention is to provide a process wherein formaldehyde and an organic acid are interacted with carbon monoxide. A further object is to provide catalysts for this synthesis. Other objects and advantages of the invention will hereinafter appear.

The above and other objects of the invention are realized by reacting formaldehyde, or one of its polymers, with carbon monoxide and an organic acid, preferably in the presence of a catalyst having acidic characteristics, and subjecting the resulting mixture to heat and pressure whereupon a substituted acetic acid is obtained in accordance with the equation:

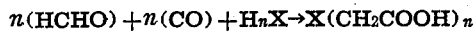
$$n(HCHO) + n(CO) + H_nX \rightarrow X(CH_2COOH)_n$$

in which X is the anion of an organic acid and $n$ is an integer. For example, when the anion of acetic acid, propionic acid, isobutyric acid, glycolic acid, benzoic acid, acrylic acid, methacrylic acid, or succinic acid is substituted for X, acetoxy, propionoxy, isobutyroxy, glycolyloxy, benzoyloxy, acryloxy, methacryloxy, succinyloxy acetic acids, respectively, are produced. In the above formula if acetic acid is used for $H_nX$ it reads:

$$HCHO + CO + H(CH_3COO) \rightarrow CH_2(CH_3COO)COOH$$

The monocarboxylic acids will give a monocarboxylic acid product while the polycarboxylic acids will give both a mono and polycarboxylic acid product, the mono usually predominating. The esters of the above designated acids, and more particularly the lower aliphatic alcohol esters of the acids, e. g., methyl acetate, ethyl acetate, isobutyl acetate, methyl propionate and the like, as well as the anhydrides, e. g., acetic anhydride, propionic anhydride, etc., may likewise be used in the presence or absence of the corresponding acid.

We have found that, generally, in the absence of added catalysts, the reaction of formaldehyde and organic acids with carbon monoxide is initiated but slowly although, as these reactions are mildly autocatalytic, they proceed progressively more rapidly after they have started. Initiation of the reaction is more rapid, however, if a suitable catalyst is added. For this purpose acidic catalysts, stronger than the organic acid present, and more particularly those which give a pH value in aqueous solution of less than 6 may be employed such, for example, as the mineral acids, hydrochloric acid, sulfuric acid, phosphoric acid and the salts having an acid reaction in aqueous solutions such as sodium acid phosphate, boron trifluoride, and the like.

These catalysts may be used in amounts ranging up to 1.0 mol thereof per mol of formaldehyde, from 0.01 to 0.1 mol being preferred. It will usually be found that with increased catalyst amount the reaction will proceed at lower temperature and pressure, while with decreased catalyst amount a somewhat higher pressure and temperature are required to effect reaction at an equal rate.

The formaldehyde may be subjected to reaction in any convenient way or in any convenient form. The monomeric or polymeric forms of the aldehydes are suitable. Thus, for example, gaseous formaldehyde, paraformaldehyde, or trioxymethylene may be used by dissolving in the organic acid before, simultaneously with or after contact with the carbon monoxide. The reaction is preferably conducted under conditions which indicate that the reactants, i. e., the aldehyde and acid, are in the liquid phase. The products of the reaction are, however, normally solids and, accordingly, it is of advantage to have an excess of the organic acid present to maintain the liquid phase conditions. The acid thus performs a dual function, that is, it is a reactant and also a solvent or reaction medium, in which the reaction is effected. Instead of an excess of the organic acid, in which the reactants are preferably soluble, other solvents may be used such, for example, as organic esters, ethers, etc., but the solvent chosen should not adversely affect the reaction.

The optimum ratio of formaldehyde to organic acid is, on a molal basis, 1:1 with a preferred rang of 1.5 to 3.0 of formaldehyde to one of acid. There is a tendency when water is present for hydrolysis of the substituted acetic acid to occur, giving, particularly when the product is recovered by distillation, not an acyloxy substituted acetic acid but, in many instances, a hydroxy substituted acetic acid which increases in amount in substantially a direct ratio to the amount of water present. The greater the concentration of the solution in aldehyde and organic acid, the less will be the tendency to hydrolyze.

The carbon monoxide required for the synthesis may conveniently be derived from various commercial sources as, for example, from water gas, producer gas, etc., by liquefaction or other methods and should, for best results, be relatively pure.

The reaction proceeds at ordinary pressures, although it is advantageous to use superatmospheric pressures, preferably of from 5 to 1500 atmospheres or more. The reaction, which is exothermic, may be effected over a wide range of temperatures, although the optimum temperature varies with specific conditions, depending, inter alia, upon the type of organic acid employed, the amount of catalyst, etc. Generally, the reaction can be carried out at temperatures ranging from 50° C. to 350° C., although temperatures between 140 and 225° C. have been found preferable. Mild cooling means should generally be provided to maintain the temperature within the selected range.

The reaction product consists essentially of a solution containing the desired substituted acetic acid, hydroxy acetic acid, a small amount of formic acid, unconverted formaldehyde, the catalyst, if one be used, and a small amount of water. The substituted acetic acid may be readily separated from this crude mixture by distillation which is preferably carried out at from 80 to 100 mm. mercury pressure. Alternatively, after distillation of the greater portion of the free water, formic acid and unchanged formaldehyde, the residue, may be neutralized, e. g., with calcium carbonate, to convert the substituted acetic acid into a readily separable salt or the residue may be esterified with a suitable alcohol for removal of the esters by distillation. In some instances it may be preferable to recover the product from the concentrated solution by crystallization, after separation of the catalyst and removal of the excess water under reduced pressures.

The following examples will illustrate methods of practicing the invention, although it will be understood that the invention is not limited to the details therein given.

*Example 1.*—There was placed in an autoclave 1 mol of solid trioxymethylene, 4 mols of acetic acid, and 0.1 mol of sulfuric acid. A carbon monoxide atmosphere was superimposed on the resulting liquid and the pressure increased to approximately 900 atmospheres. The autoclave and contents were heated to a temperature of 124 to 164° C. for a period of approximately 60 minutes with continuous agitation. The pressure was released and the contents of the autoclave, upon analysis, showed a 70% yield of acetoxy acetic acid.

*Example 2.*—The process of Example 1 was repeated using a mixture containing 1 mol of formaldehyde, 2 mols of propionic acid and 0.02 mol of sulfuric acid. The reaction was conducted in the presence of excess carbon monoxide at a temperature between 195 and 205° C., at a pressure between 800 and 900 atmospheres and for a period of 60 minutes. The product, on analysis, showed a 56% yield of propionoxy acetic acid.

*Example 3.*—The process of Example 1 was repeated using a mixture containing 1 mol of formaldehyde, 2 mols of isobutyric acid and 0.02 mol of sulfuric acid. The reaction was conducted in the presence of excess carbon monoxide at a temperature between 193 and 212° C., at a pressure between 800 and 900 atmospheres and for 60 minutes. A 49% yield of isobutyroxy acetic acid was obtained.

*Example 4.*—The process of Example 1 was repeated using a mixture containing 1 mol of formaldehyde, 4 mols of methyl acetate and 0.1 mol of sulfuric acid. At a temperature between 180 and 200° C. and at a pressure between 800 and 900 atmospheres, the reaction was conducted in the presence of excess carbon monoxide for 60 minutes. A 92% yield of acetoxy acetic acid was obtained.

It is known that under proper conditions formaldehyde will react with organic acids to give addition products. According to the present invention, in lieu of initiating the reaction with formaldehyde and an organic acid as the starting material, an addition product resulting from the interaction of formaldehyde and the organic acid, or identical compounds obtained by other methods, may be employed. These compounds decompose under the conditions of the reaction to give formaldehyde and the organic acid and consequently are suitable as starting materials. Accordingly, my invention includes reactions involving such compounds. Specifically, these compounds include the diacyloxy methylenes such, for example, as methylene diacetate, methylene dipropionate, and the like; the half esters of methylene glycol in which the ester portion is an acyloxy compound, such as the vicinal derivatives of glycolic acid; the mono and diacyloxy substituted ethers such, for example, as monoacyloxy dialkyl ether; the symmetrical acyloxy dimethyl ethers, such as monopropionoxy diethyl ether, diacetoxy dimethyl ether, and the higher substituted acyloxy substituted ethers. Ordinarily, it is advisable to have water present when the reaction is conducted with these addition compounds, although the reaction will occur in the absence of water. While, as has been shown, the addition products of formaldehyde with the organic acids may be used, I prefer to carry out the reaction by the interaction of formaldehyde, an organic acid and carbon monoxide.

While the examples have referred particularly to carrying out the process in a more or less discontinuous manner, the process of the invention may likewise be effected in a continuous manner, for example, by passing formaldehyde, organic acid and catalyst through a reaction zone either co-current or counter-current to the flow of carbon monoxide, the rates of flow being adjusted to yield the desired degree of reaction. The carbon monoxide should be maintained, as in the processes described in the examples, at a suitable pressure and the temperature of the continuous reaction should be held within the prescribed range by suitable heating means.

In order to insure adequate intimate contact between the reactants, thorough stirring is essential to high yields when conducting the process in an autoclave, and no matter what the type of reaction vessel used may be, intimate contact is also of considerable importance if optimum results are desired.

Because of the corrosive nature of the catalyst and reactants, it is advisable to carry out the process of the invention in glass, silica, porcelain or glass-lined vessels or the inner surface of the reaction vessel which contacts with the reactants should be constructed of such corrosion-resistant metals as silver, chromium, stainless steel and the like.

When formaldehyde is referred to in the appended claims it will be understood that paraformaldehyde, trioxymethylene, or any polymeric or monomeric form of formaldehyde, is included.

From a consideration of the above specification it will be appreciated that many changes may be made in the details, conditions and reactants given without in any way departing from the invention or sacrificing any of the advantages which may be derived therefrom.

We claim:

1. A process of producing an acyl-oxy acetic acid which comprises reacting formaldehyde, an organic acid and carbon monoxide in the substantial absence of water, substantially in accord with the following equation:

$$n(\text{HCHO}) + n(\text{CO}) + H_nX \rightarrow X(CH_2COOH)_n$$

in which X is the anion of an organic acid and $n$ is an integer.

2. The process of claim 1 conducted in the presence of a mineral acid catalyst.

3. The process of claim 1 conducted at a temperature between 50–350° C.

4. The process of claim 1 conducted at a pressure in excess of 5 atmospheres.

5. A process of producing a substituted acetic acid which comprises reacting formaldehyde, an organic acid and carbon monoxide under substantially anhydrous conditions.

6. The process of claim 5 carried out in the presence of a strong mineral acid as the catalyst.

7. The process of producing an acyl-oxy acetic acid which comprises reacting formaldehyde, carbon monoxide and a compound selected from the group consisting of organic acids, their esters and anhydrides, under substantially anhydrous conditions.

8. The process of producing an acyl-oxy acetic acid which comprises reacting the reaction product of formaldehyde and an organic acid with carbon monoxide.

9. A process of producing an acyl-oxy acetic acid which comprises reacting formaldehyde and an anhydrous organic acid with carbon monoxide at a temperature of from 50 to 350° C., a pressure of at least 5 atmospheres and in the presence of a catalyst having a pH of less than 6 when in aqueous solution.

10. A process for the preparation of an acyl-oxy acetic acid which comprises interacting, under substantially anhydrous conditions, formaldehyde, an organic acid and carbon monoxide in accord with the equation:

$$\text{HCHO} + \text{CO} + \text{HX} \rightarrow CH_2XCOOH$$

in which X is the anion of a monocarboxylic aliphatic organic acid, at a temperature between 50 and 350° C. and a pressure of at least 5 atmospheres.

11. A process for the preparation of acetoxy acetic acid which comprises interacting, under substantially anhydrous conditions, formaldehyde, acetic acid and carbon monoxide in accord with the equation:

$$\text{HCHO} + \text{CO} + H(CH_3COO) \rightarrow CH_2(CH_3COO)COOH$$

at a temperature between 50 and 350° C., a pressure of at least 5 atmospheres and in the presence of a mineral acid catalyst.

12. The process of claim 11 conducted in the presence of hydrochloric acid as the catalyst.

13. The process of claim 11 conducted in the presence of sulfuric acid as the catalyst.

14. A process for the preparation of acetoxy acetic acid which comprises bringing a mixture consisting of approximately 1 mol of formaldehyde and 1 mol of acetic acid under substantially anhydrous conditions into contact with carbon monoxide at a temperature between 140 and 225° C. and at a pressure of approximately 900 atmospheres.

15. A process for the preparation of propionoxy acetic acid which comprises reacting, under substantially anhydrous conditions, formaldehyde and propionic acid with carbon monoxide.

16. A process for the preparation of a substituted acetic acid which comprises reacting, under substantially anhydrous conditions, carbon monoxide with a compound which, under the conditions of the reaction, hydrolyzes to form formaldehyde and an organic acid.

17. The process of claim 16 conducted in the presence of a mineral acid catalyst at a temperature of 50 to 350° C. and at a pressure in excess of 5 atmospheres.

EDWARD P. BARTLETT.
DONALD J. LODER.